US007045717B2

(12) United States Patent
Kolvick et al.

(10) Patent No.: US 7,045,717 B2
(45) Date of Patent: May 16, 2006

(54) HIGH SPEED CABLE INTERCONNECT TO A COMPUTER MIDPLANE

(75) Inventors: Randolph Scot Kolvick, Durham, NC (US); Peter Andrew Smith, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/881,376

(22) Filed: Jun. 30, 2004

(65) Prior Publication Data

US 2006/0003621 A1 Jan. 5, 2006

(51) Int. Cl.
*H02G 1/00* (2006.01)

(52) U.S. Cl. .......................... 174/135; 174/50; 174/60; 361/725

(58) Field of Classification Search ................ 174/135, 174/50.52, 50.53, 50.57, 52.4, 50, 138 B, 174/60, 59; 439/377, 374; 361/725, 726, 361/727, 828, 825

See application file for complete search history.

(56) References Cited

U.S. PATENT DOCUMENTS 6,422,876 B1 7/2002 Fitzgerald et al.
2003/0030991 A1 * 2/2003 Riddiford et al. ........... 361/724

* cited by examiner

*Primary Examiner*—Jinhee Lee
(74) *Attorney, Agent, or Firm*—Martin J. McKinley; Dillon & Yudell LLP

(57) ABSTRACT

A carrier that houses an external cable terminated at a male cable connector that mates with a female midplane connector on a midplane in a server blade computer is presented. The carrier includes side channel guides that align the carrier with the female midplane connector for a precise mating with the male cable connector. A light channel in the carrier captures light from a status light emitting diode (LED) at the midplane, and transmits that light to an externally visible end of the carrier.

6 Claims, 6 Drawing Sheets

104

HIGH SPEED CABLE INTERCONNECT TO A COMPUTER MIDPLANE

BACKGROUND OF THE INVENTION

1. Technical Field

The present invention relates in general to the field of computers, and in particular to high speed interconnections in a computer. Still more particularly, the present invention relates to a method and system for cable/connector carrier that directly connects a high speed external cables to an internal connector on a midplane in a computer chassis.

2. Description of the Related Art

Modern computer systems are able to manipulate data at very high speeds. However, if data is unable to get into and out of the computer, this computing speed is of little value. Therefore, high speed interfaces (using high frequency for increased bandwidth) are common on most modern computers. Such interfaces handle data either in serial or parallel fashion. There are many such interface protocols known to those skilled in the art of computers, and such interfaces will not be itemized here.

Many modern computer systems, and particularly servers, utilize a blade configuration, such as depicted in FIG. 1 as a server blade computer 100. Server blade computer 100 offers high-density server boards (blades 102) in a single server blade chassis (blade center chassis 104). Server blade chassis 104 includes multiple hot-swappable server blades 102*a–n* connected on a midplane 106. Midplane 106 is a backplane, mounted in the middle of server blade chassis 104, that contains circuitry and sockets into which additional electronic devices or cards, including server blades 102, can be plugged.

There are typically fourteen server blades 102 in server blade chassis 104. The operations of server blades 102 are coordinated by logic identified as management module 108, which includes a processor (not shown) for controlling input/output (I/O) functions, controlling a power supply 116, interfacing with networks (such as the Internet or a Local Area Network), and allocating jobs and data to the different server blades 102.

Each server blade 102 includes a Baseboard Management Controller (BMC) 110, which provides an interface between the server blade 102 and the midplane 106. Coupled to the BMC 110 is a Central Processing Unit (CPU) 112, which is preferably multiple processors in a same partition. Coupled to CPU 112 is a system memory 114, which typically includes a primary and a backup system memory, which may be a DIMM, SIMM, or any similar volatile memory. For purposes of clarity, only components for server blade 102*a* are shown, each labeled with an "a" suffix. It is understood that each of the server blades 102 have similar components as those shown for server blade 102*a*.

As described above, management module 108 can control input/output operations, including those between the midplane 106 and an input/output (I/O) card 118. The I/O card 118 provides both a logical and a physical interface between midplane 106 and a back 120 of server blade chassis 104. That is, I/O card 118 connects to midplane 106 via a midplane connector 122*a*, and I/O card has a male coupler 124 for connecting to an external female coupler 126 on back 120. As external female coupler 126 terminates an external cable 128, then data is allowed to be input/output via the external cable 128.

However, I/O card 118 often is often strictly limiting as to the signal length (due to bandwidth) that it can route to external female coupler 126*a* via male coupler 124*a*. Therefore, an internal cable 130 must often be used to connect midplane 106 to an external female coupler 126*b* and an external cable 128*b* via a male coupler 124*b* as depicted. Serious disadvantages of internal cable 128 are that it is expensive, it adds an extra interconnect for a signal from midplane 106 that can adversely affect signal quality, and it is physically difficult to access midplane 106 to plug a midplane connector 122*b* into midplane 106.

What is needed, therefore, is a system for connecting an external cable directly into a midplane, preferably mating with an existing midplane female connector.

SUMMARY OF THE INVENTION

Therefore, the present invention is directed to a carrier that houses an external cable terminated at a male cable connector that mates with a female midplane connector on a midplane in a server blade computer. The carrier includes side channel guides that align the carrier with the female midplane connector such that a precise mating with the male cable connector. A light channel in the carrier captures light from a status light emitting diode (LED) at the midplane, and transmits that light to an externally visible end of the carrier.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF A PREFERRED EMBODIMENT

Figure 1:
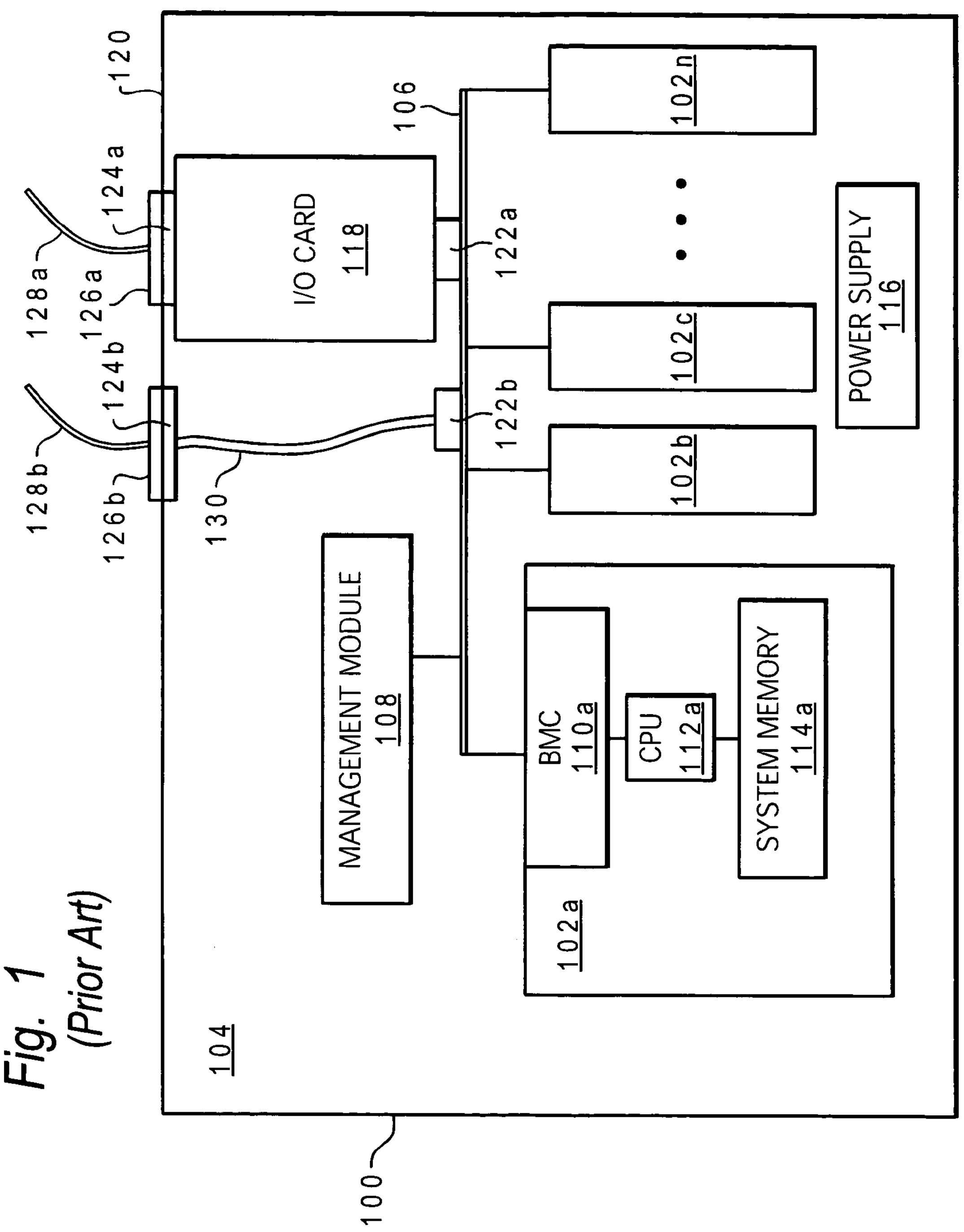
Fig. 1 (Prior Art)
FIG. 1 depicts a diagram of a prior art input/output card connected to a midplane in a server blade chassis.
Figure 2:
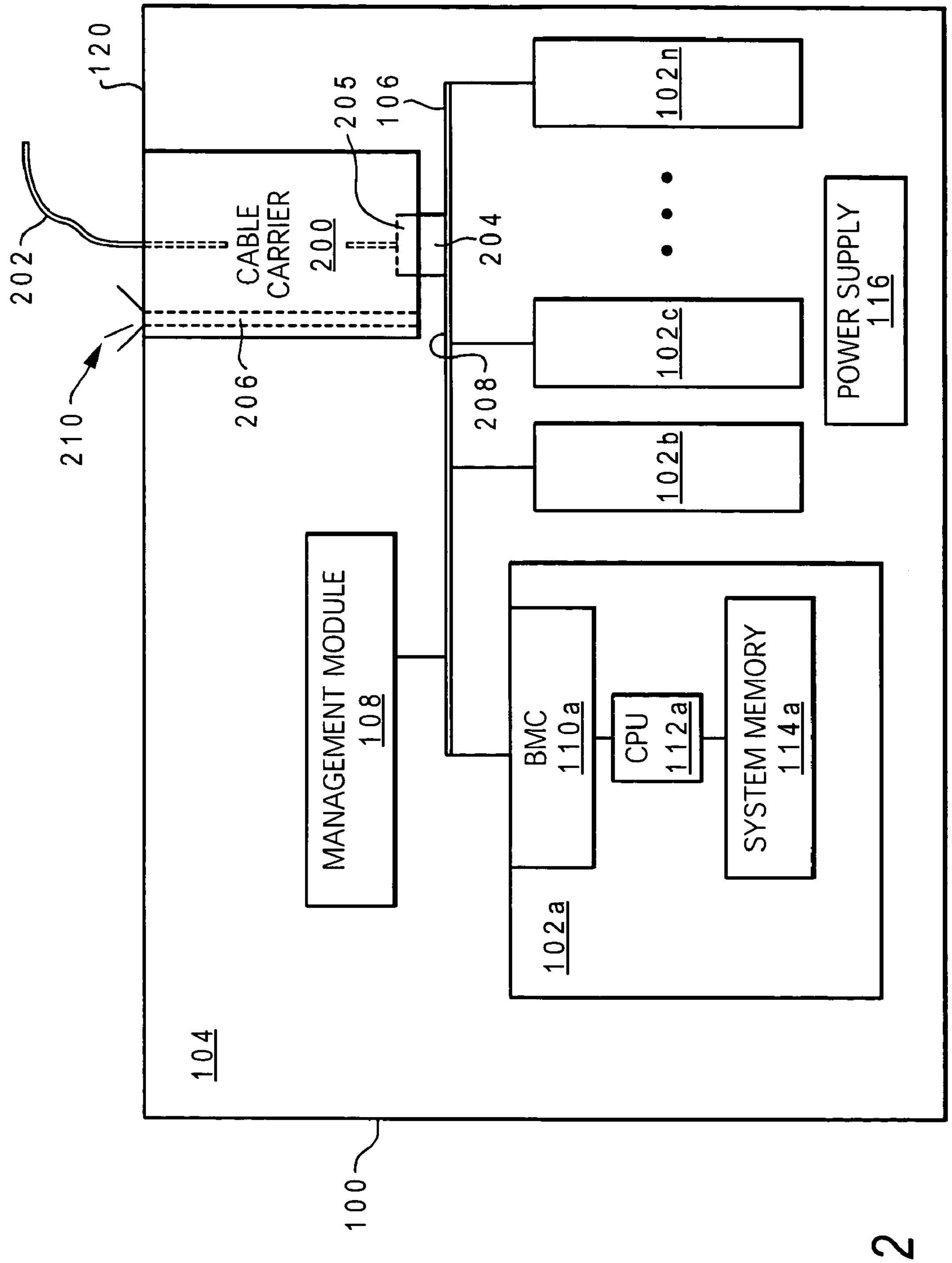
FIG. 2 is a block diagram of the inventive external cable chassis coupled to the midplane in the server blade chassis.

With reference now to FIG. 2, there is depicted a similar server blade computer 100 as described above in FIG. 1. However, FIG. 2 now depicts a cable carrier 200, which couples to midplane 106 via a female midplane connector 204. (Note that the terms "male" and "female" as used in the description and claims of the present invention are used for illustrative purposes only, and may be interchanged. That is, any pair of connectors described as "male" and "female" are so described in the context of the present invention as a pair of connectors that are capable of being physically and electrically connected, although a preferred embodiment envisions the connectors as being "male" and "female" as so named.)

Cable carrier 200 securely houses an external cable 202, which terminates at a male cable connector 205. Cable connector 205 is securely mounted to, and preferably with, cable carrier 200 to allow precise alignment between midplane connector 204 and cable connector 205. Note that cable 202 enters/exits cable carrier 200 via an opening 201.

Note also a light channel 206. Midplane 106 may have one or more status lights 208, which are typically light emitting diodes (LEDs) indicating a status (such as a link status of similar function) of a device in server blade computer 100 that is coupled to midplane connector 204. Light channel 206 allows the light from status light 208 to travel through cable carrier 200 and out a light portal 210, allowing a user to "see" status light 208. As shown in FIG. 2, external cable 202 is thus able to directly couple to midplane 106 using cable carrier 200. Details of a preferred construction and geometry of cable carrier 200 are shown in the following figures.

Figure 3A:
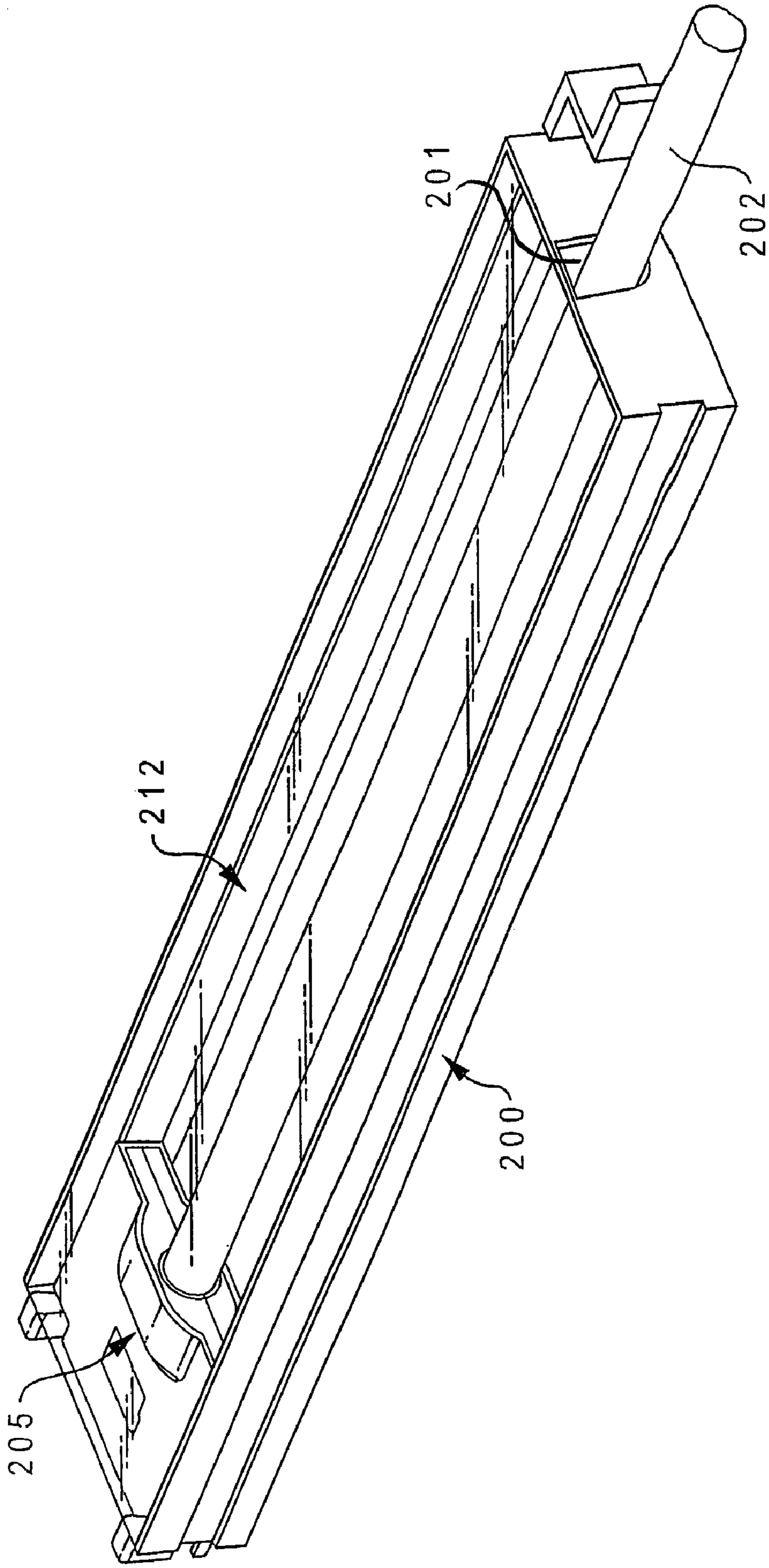
FIGS. 3*a–b* illustrate detail of the external cable chassis.
Figure 4:
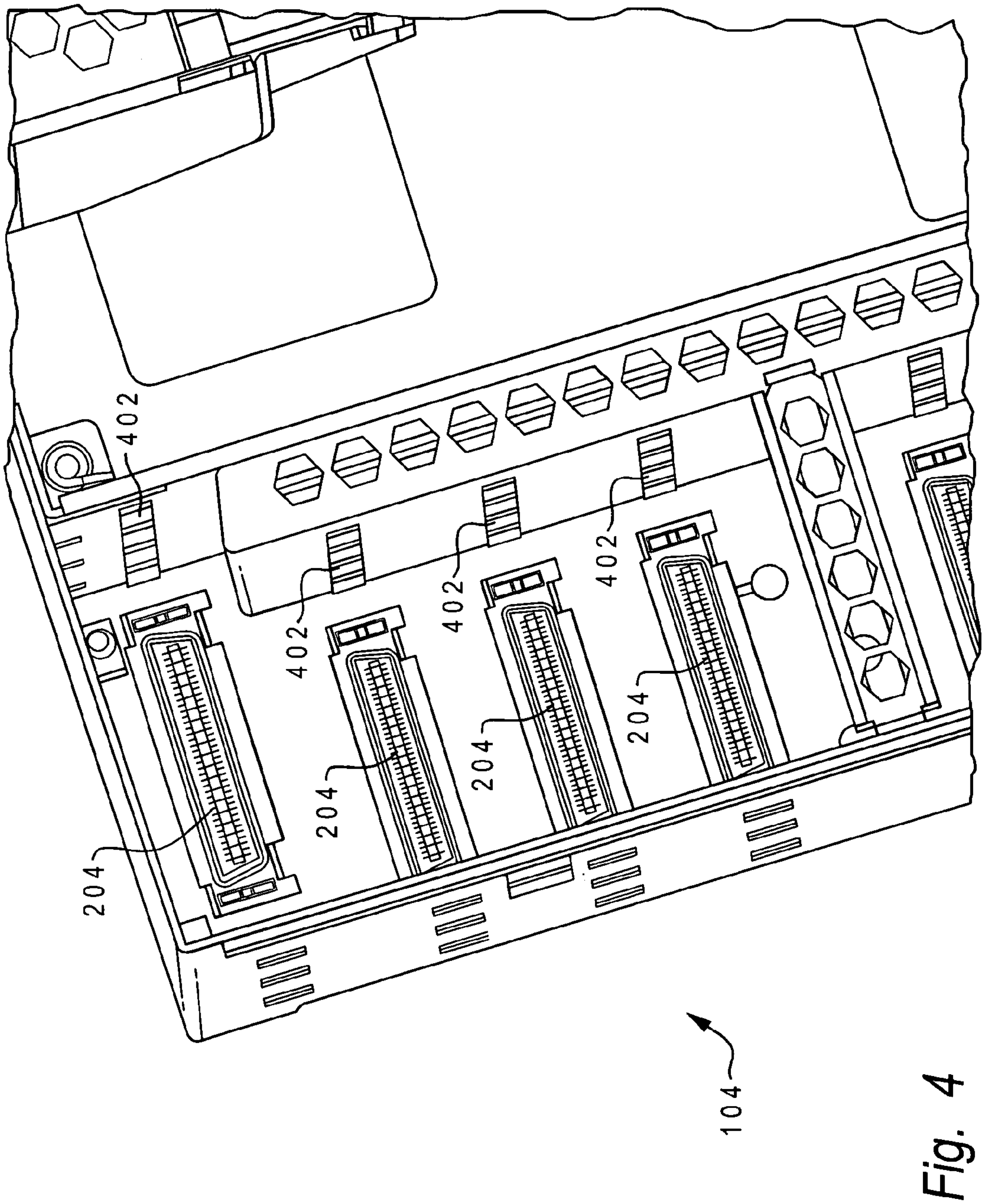
FIG. 4 depicts female midplane couplers on the midplane in the server blade chassis.

With reference now to FIG. 3*a*, details of a preferred embodiment of cable carrier 200 are shown. Cable 202 enters a back end of cable carrier 200, travels through the interior of cable carrier 200, and terminates at cable connector 205. Cable connector 205 has blind mating ability due to features described below in FIG. 4*b*. In a preferred embodiment, cable 202 is enclosed within cable carrier 200 as shown using a cover 212, which is shown as being translucent for added clarity of the present invention, but may or may not be translucent in actual practice.

Figure 3B:
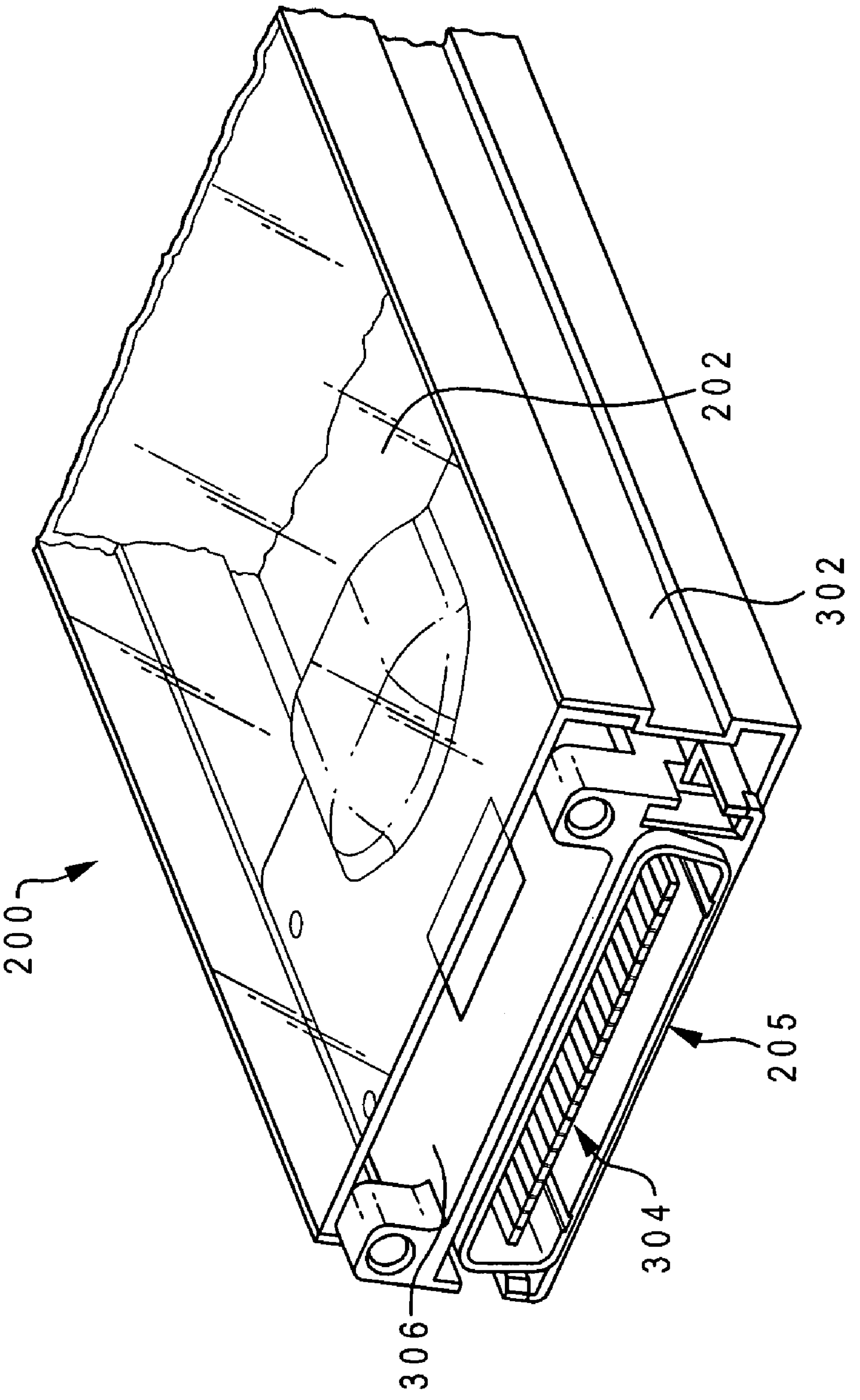

With reference now to FIG. 3*b*, a front end of cable carrier 200 is shown. Note that cable connector 205 is rigidly mounted within cable carrier 200. Thus, when cable carrier 200 is inserted inside a server blade chassis 104 (as in FIG. 5 below), cable connector 205 is firmly oriented to mate properly with midplane connector 204. This orientation is assured by guide channels 302, where a guide channel 302 is on each side of cable carrier 205. These guide channels 302 slide about carrier guides 402, shown in FIG. 4. The carrier guides 402 cause cable carrier 200 to slide into server blade chassis 104 in an orientation that forces cable connector 205 to smoothly mate inside midplane connector 204.

Referring again to FIG. 3*b*, note that male pins 304 and cable connector 205 itself are both protected by a securement 306, which locks cable connector 205 into cable carrier 200, and protects cable connector 205 from lateral impact.

Figure 5:
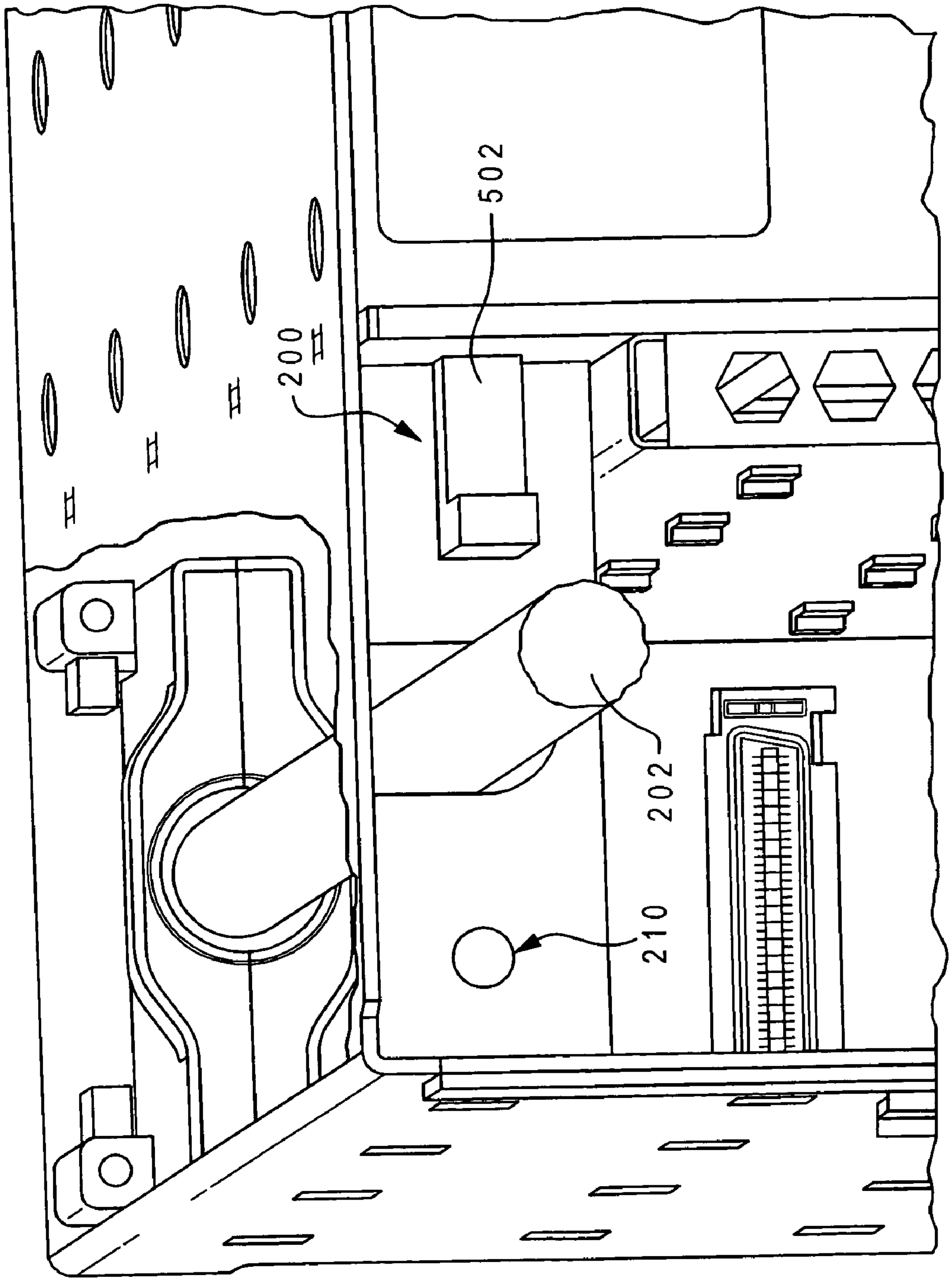
FIG. 5 illustrates the external cable carrier mounted in the server blade chassis.

With reference now to FIG. 5, cable carrier 200 is shown mounted in server blade chassis 104, with cable connector 205 securely mated with midplane connector 204 (neither connector shown in FIG. 5). Cable carrier 200 is locked into server blade chassis 104 with a latch 502, which is preferably designed to be unlatched without the use of tools. Note also light portal 210, allowing a user to "see" status light 208, as described above in FIG. 2.

While the invention has been particularly shown and described with reference to a preferred embodiment, it will be understood by those skilled in the art that various changes in form and detail may be made therein without departing from the spirit and scope of the invention. For example, the exemplary embodiment shown in FIG. 2 is provided solely for the purposes of explaining the invention and those skilled in the art will recognize that numerous variations are possible, both in form and function. For instance, server blade computer 100 might also include a compact disk read-only memory (CD-ROM) or digital versatile disk (DVD) drive, a sound card and audio speakers, and numerous other optional components. Likewise, cable carrier 200 may be used in any system having a comparable midplane in which it would be advantageous to use cable carrier 200 to couple a first and second connector as described in the present invention.

What is claimed is:

1. A cable interconnect to a computer midplane, the cable interconnect comprising:

- an enclosure having a first end oriented towards the computer midplane and a second end oriented towards a back of a server blade chassis that houses the computer midplane;
- a cover on the enclosure;
- an opening at the second end of the enclosure, wherein a cable enters the enclosure through the opening;
- a cable connector at a terminal end of the cable, wherein the cable connector is rigidly mounted within an interior of the enclosure at the first end of the enclosure by a securement, wherein the securement locks the cable connector into the enclosure and protects the cable connector from lateral impact;
- guide channels on the enclosure that slide about carrier guides that are mounted within the server blade chassis, wherein the carrier guides cause the enclosure to slide into the server blade chassis in an orientation that forces the cable connector to smoothly mate with a midplane connector that is mounted on the computer midplane;
- a latch that is connected to the second end of the enclosure, wherein the latch locks the enclosure into the server blade chassis; and
- a light channel traversing through the interior of the enclosure, wherein the light channel is aligned with a status light on the computer midplane, wherein light from the status light travels through the light channel and out the back of the server blade chassis via a light portal, wherein the light portal is oriented at an end of the light channel that is opposite the computer midplane.

2. The cable interconnect of claim 1, wherein the cable connector is a male connector and the midplane connector is a female connector.

3. The cable interconnect of claim 1, wherein the cover of the enclosure is translucent.

4. A computer system, the multiprocessor computer system comprising a cable carrier to a midplane in the computer system, the cable carrier comprising:

- an enclosure having a first end oriented towards a computer midplane and a second end oriented towards a back of a server blade chassis that houses the computer midplane;
- a cover on the enclosure;
- an opening at the second end of the enclosure, wherein a cable enters the enclosure through the opening;
- a cable connector at a terminal end of the cable, wherein the cable connector is rigidly mounted within an interior of the enclosure at the first end of the enclosure by a securement, wherein the securement locks the cable connector into the enclosure and protects the cable connector from lateral impact;
- guide channels on the enclosure that slide about carrier guides that are mounted within the server blade chassis, wherein the carrier guides cause the enclosure to slide into the server blade chassis in an orientation that forces the cable connector to smoothly mate with a midplane connector that is mounted on the computer midplane;
- a latch that is connected to the second end of the enclosure, wherein the latch locks the enclosure into the server blade chassis; and a light channel traversing through the interior of the enclosure, wherein the light channel is aligned with a status light on the computer midplane, wherein light from the status light travels through the light channel and out the back of the server blade chassis via a light portal, wherein the light portal is oriented at an end of the light channel that is opposite the computer midplane.

5. The computer system of claim 4, wherein the cable connector is a male connector and the midplane connector is a female connector.

6. The computer system of claim 4, wherein the cover of the enclosure is translucent.

* * * * *